(12) United States Patent
Soler Garrido et al.

(10) Patent No.: US 12,513,166 B2
(45) Date of Patent: Dec. 30, 2025

(54) METHOD AND SYSTEM FOR AUTOMATED ANALYSIS OF INDUSTRIAL CYBERSECURITY EVENTS

(71) Applicant: Siemens Aktiengesellschaft, Munich (DE)

(72) Inventors: Josep Soler Garrido, Seville (ES); Marco Caselli, Munich (DE); Jan Kissling, Graben-Neudorf (DE)

(73) Assignee: Siemens Aktiengesellschaft, Munich (DE)

( * ) Notice: Subject to any disclaimer, the term of this patent is extended or adjusted under 35 U.S.C. 154(b) by 110 days.

(21) Appl. No.: 18/564,809

(22) PCT Filed: Jun. 7, 2022

(86) PCT No.: PCT/EP2022/065405
§ 371 (c)(1),
(2) Date: Nov. 28, 2023

(87) PCT Pub. No.: WO2022/258620
PCT Pub. Date: Dec. 15, 2022

(65) Prior Publication Data
US 2024/0275798 A1    Aug. 15, 2024

(30) Foreign Application Priority Data
Jun. 8, 2021   (EP) ..................... 21178310

(51) Int. Cl.
*H04L 29/06* (2006.01)
*H04L 9/40* (2022.01)

(52) U.S. Cl.
CPC .... *H04L 63/1416* (2013.01); *G06F 2221/034* (2013.01)

(58) Field of Classification Search
None
See application file for complete search history.

(56) References Cited

U.S. PATENT DOCUMENTS 9,535,902 B1 *  1/2017  Michalak ............ G06F 16/3331
10,510,018 B2 * 12/2019  Flinn .................... G06F 40/216
(Continued)

FOREIGN PATENT DOCUMENTS

WO   2020014181 A1   1/2020

OTHER PUBLICATIONS

Aleroud, Ahmed; Karabatis, George. Context Infusion in Semantic Link Networks to Detect Cyber-attacks: A Flow-Based Detection Approach. 2014 IEEE International Conference on Semantic Computing. https://ieeexplore.ieee.org/stamp/stamp.jsp?tp=&arnumber=6882020 (Year: 2014).*

(Continued)

*Primary Examiner* — Jeremiah L Avery
(74) *Attorney, Agent, or Firm* — Schmeiser, Olsen & Watts, LLP

(57) ABSTRACT

A first mapping component produces observed triple statements from events received from a security tool monitoring an industrial system. A link-prediction component estimates a probability score for each observed triple statement by link prediction in a knowledge graph. A scoring component computes a priority score for an entity of the industrial system contained in the knowledge graph and/or events based on the probability scores. Priority scores can be computed for some or all possible events in the industrial system as a reference to prioritize alerts coming from the security tools. The system works in an unsupervised manner. In fact, the system does not directly try to infer (predict) maliciousness in entities or events on the knowledge graph. Instead, priority scores are used during operation to evaluate actual system observations and prioritize them. Therefore, a knowledge graph-based recommendation system for automated analysis of industrial cybersecurity events is provided.

15 Claims, 8 Drawing Sheets

(56) References Cited

U.S. PATENT DOCUMENTS

| | | | |
|---|---|---|---|
| 10,713,577 B1* | 7/2020 | Faruquie | G06N 5/022 |
| 10,902,117 B1* | 1/2021 | Singh | G06N 5/025 |
| 10,949,535 B2* | 3/2021 | Luo | G06N 20/20 |
| 11,062,700 B1* | 7/2021 | Azimi | G06N 20/10 |
| 11,257,594 B1* | 2/2022 | Krasnoslobodtsev | G06F 40/30 |
| 11,442,992 B1* | 9/2022 | Moon | G06N 20/00 |
| 11,829,420 B2* | 11/2023 | Galitsky | G06F 16/90332 |
| 12,143,404 B2* | 11/2024 | Atkinson | H04L 63/029 |
| 2010/0070448 A1* | 3/2010 | Omoigui | H10F 39/1825 706/55 |
| 2014/0282586 A1* | 9/2014 | Shear | G06F 16/245 718/104 |
| 2019/0319868 A1* | 10/2019 | Svennebring | H04W 24/08 |
| 2019/0394242 A1* | 12/2019 | Wig | G06N 5/048 |
| 2021/0089656 A1* | 3/2021 | Moran | G06F 21/554 |
| 2021/0117624 A1* | 4/2021 | Aghajanyan | G06Q 30/0631 |
| 2021/0182996 A1* | 6/2021 | Cella | G06Q 10/0631 |
| 2021/0210170 A1* | 7/2021 | Gardner | G16H 70/40 |
| 2021/0224237 A1* | 7/2021 | Faruquie | G06N 5/01 |
| 2021/0248514 A1* | 8/2021 | Cella | G06V 20/20 |
| 2021/0273961 A1* | 9/2021 | Humphrey | G06N 7/01 |
| 2021/0295822 A1* | 9/2021 | Tomkins | G06F 16/3338 |
| 2022/0019674 A1* | 1/2022 | Frey | H04L 63/14 |
| 2022/0188654 A1* | 6/2022 | Knuff | G06N 3/047 |
| 2022/0188700 A1* | 6/2022 | Khavronin | G06Q 30/0201 |
| 2022/0292262 A1* | 9/2022 | Japa | G06N 5/041 |

OTHER PUBLICATIONS

Wang, Quan et al. Knowledge Graph Embedding: A Survey of Approaches and Applications. IEEE Transactions on Knowledge and Data Engineering, vol. 29, Issue: 12. https://ieeexplore.ieee.org/stamp/stamp.jsp?tp=&arnumber=8047276 (Year: 2017).*

Li, QiuAo et al. The Construction of Knowledge Graph based on Securities Information. 2019 IEEE International Conference on Computer Science and Educational Informatization (CSEI). https://ieeexplore.ieee.org/stamp/stamp.jsp?tp=&arnumber=8938986 (Year: 2019).*

Josep Soler Garrido et al: "Machine learning on knowledge graphs for context-aware security monitoring"; arxiv.org, Cornell University Library; XP081965354; 2021.

A. Bordes et al.: "Translating embeddings for modeling multirelational data, in Advances in neural information processing systems" pp. 2787-2795, 2013, TransE.

J. J. Hopfield et al: "Neural Networks and Physical Systems With Emergent Collective Computational Abilities", Proc. Natl. Acad. Sci. USA, vol. 79, Apr. 1982, Biophysics, California, pp. 2554-2558.

Martin Ringsquandl: "Semantic-guided predictive modeling and relational learning within industrial knowledge graphs"; pp. 1-156; XP055850878; URL: https://edoc.ub.uni-muenchen.de/25380/1/Ringsquandl Martin.pdf; 2019.

G. E. Hinton. et al.: "Learning and relearning in Boltzmann machines". Parallel distributed processing: Explorations in the microstructure of cognition 1, 2 (1986); 1986.

Schlichtkrull et al.:, Modeling Relational Data with Graph Convolutional Networks arXiv:1703.06103 (2017).

Nickel, M., Tresp, V. & Kriegel, H.- P.: "A three-way model for collective learning on multi-relational data"; in Icml 11 (2011), 809-816.

PCT International Search Report and Written Opinion of the International Searching Authority mailed Sep. 9, 2022 corresponding to PCT International Application No. PCT/EP2022/065405 filed Jul. 6, 2022.

Yang, B., Yih, W.-t., He, X., Gao, J. and Deng, L.: Embedding entities and relations for learning and inference in knowledge bases, arXiv preprint arXiv:1412.6575 (2014).

* cited by examiner

METHOD AND SYSTEM FOR AUTOMATED ANALYSIS OF INDUSTRIAL CYBERSECURITY EVENTS

CROSS-REFERENCE TO RELATED APPLICATIONS

This application claims priority to PCT Application No. PCT/EP2022/065405, having a filing date of Jun. 7, 2022, which claims priority to EP Application No. 21178310.5, having a filing date of Jun. 8, 2021, the entire contents all of which are hereby incorporated by reference.

FIELD OF TECHNOLOGY

The following relates to a method and system for automated analysis of industrial cybersecurity events.

BACKGROUND

Anomaly-based intrusion detection systems (IDS) are often ineffective due to their low incident detection rates as well as high false-positive rates. On one side, attackers are typically aware of the traffic and activity patterns seen on their target networks and are often successful in disguising their actions as legitimate activity. On the other hand, anomaly-based IDSs are prone to produce large amounts of false positives, especially in highly dynamic systems where it is almost impossible to capture reliable activity baselines.

When an anomaly-based IDS is deployed, a baseline of the system to be protected is typically created by observing its behavior for a certain amount of time, during which it is assumed that no malicious activity takes place. After this, any deviations found between the behavior observed and the baseline is considered an anomaly and potentially an attack. This approach yields poor results if the baseline does not capture all legitimate interactions or these are rapidly changing, as is typical in modern industrial control systems.

Modern factories and automation systems are characterized by a tight integration of operational technology with traditional IT systems and by increasing digitalization through, for example, the presence of edge computing systems that host AI-enabled apps and perform complex monitoring and optimization tasks, or the availability of autonomous robots that increase the flexibility and efficiency of production lines. This in turn creates more dynamic and difficult to predict interactions between components in the system. As introduced at the beginning of the section, on the one hand, this makes it easier for attackers to hide their activity and increases the amount of false alarms coming from traditional IDS systems. The high number of alerts can, ultimately, result in "alarm fatigue" due to the very limited number of human analysts typically available to attend IDS alerts.

Due to the problem described, in many cases anomaly-based IDS are not employed in dynamic systems where behaviors are not highly deterministic and predictable, and if they are employed, their alarms are usually stored for logging or forensics purposes but not used directly. In some cases, more advanced IDS systems may prioritize alerts so that security analysts focus first on the most severe ones. However, the priority is typically done by considering each event in isolation. For instance, alerts involving systems which are considered highly sensitive, such as PLC controllers, may automatically be classified as severe. This eventually generates many inaccuracies as the severity of anomalies is typically determined not by their content itself, but by the context on which the anomaly is found, such as the state and activity of adjacent systems, previous alerts involving these, and their actual purpose in the industrial system.

Some advanced state-of-the-art approaches address this by using graph representations as a means to integrate additional context. For example, U.S. Pat. No. 10,785,239 B2 discloses a system that leverages graphs as a structure able to integrate heterogeneous data and to predict maliciousness of events by machine learning.

Graph-based data analytics are playing an increasingly crucial role in industrial applications. A prominent example are knowledge graphs, based on graph-structured databases able to ingest and represent (with semantic information) knowledge from potentially multiple sources and domains. Knowledge graphs are rich data structures that enable a symbolic description of abstract concepts and how they relate to each other. The use of knowledge graphs makes it possible to integrate previously isolated data sources in a way that enables AI and data analytics applications to work on a unified, contextualized, semantically rich knowledge base, enabling more generic, interpretable, interoperable and accurate AI algorithms which perform their tasks (e.g., reasoning or inference) working with well-defined entities and relationships from the domain(s) of interest, e.g., industrial automation or building systems.

FIG. 7 shows a simplified example of an industrial knowledge graph KG describing parts of an industrial system. In general, a knowledge graph consists of nodes representing entities and edges representing relations between these entities. For instance, in an industrial system, the nodes could represent physical entities like sensors, industrial controllers like PLCs, robots, machine operators or owners, drives, manufactured objects, tools, elements of a bill of materials, or other hardware components, but also more abstract entities like attributes and configurations of the physical objects, production schedules and plans, skills of a machine or a robot, or sensor measurements. For example, an abstract entity could be an IP address, a data type or an application running on the industrial system, as shown in FIG. 7.

How these entities relate to each other is modeled with edges of different types between nodes. This way, the graph can be summarized using semantically meaningful statements, so-called triples or triple statements, that take the simple and human-readable shape 'subject-predicate-object', or in graph format, 'node-relation-node'.

Multi-relational graphs such as the industrial knowledge graph shown in FIG. 7 are rich data structures used to model a variety of systems and problems like industrial projects. It is therefore not surprising that the interest in machine learning algorithms capable of dealing with graph-structured data has increased lately.

FIG. 8 shows a set of triple statements T that summarizes the industrial knowledge graph KG shown in FIG. 7 based on observed triple statements OT that are known, as well as two unobserved triple statements UT that are currently not contained in the industrial knowledge graph KG and therefore unknown. Inference on graph data is concerned with evaluating whether the unobserved triple statements UT are valid or not given the structure of the knowledge graph KG.

Although multi-relational graphs are highly expressive, their symbolic nature prevents the direct usage of classical statistical methods for further processing and evaluation. Lately, graph embedding algorithms have been introduced to solve this problem by mapping nodes and edges to a vector space while conserving certain graph properties. For example, one might want to conserve a node's proximity, such that connected nodes or nodes with vastly overlapping neighborhoods are mapped to vectors that are close to each other. These vector representations can then be used in traditional machine learning approaches to make predictions about unseen statements, realizing abstract reasoning over a set of subjects, predicates, and objects.

Complex systems like industrial factory systems can be described using the common language of knowledge graphs, allowing the usage of graph embedding algorithms to make context-aware predictions in these information-packed environments.

SUMMARY

An aspect relates to an industrial device and a method for automated analysis of industrial cybersecurity events that provide an alternative to the state of the conventional art.

In embodiments, the method for automated analysis of industrial cybersecurity events comprises the following operations performed by components, wherein the components are software components executed by one or more processors and/or hardware components:
producing, by a first mapping component, observed triple statements from events received from at least one security tool monitoring an industrial system,
estimating, by a link-prediction component, a probability score for each observed triple statement by link prediction in a knowledge graph representing the industrial system, and
computing, by a scoring component, at least one priority score for at least one entity of the industrial system contained in the knowledge graph and/or at least one of the events based on the probability scores.

The system for automated analysis of industrial cybersecurity events comprises
a first mapping component, configured for producing observed triple statements from events received from at least one security tool monitoring an industrial system,
a link-prediction component, configured for estimating a probability score for each observed triple statement by link prediction in a knowledge graph representing the industrial system, and
a scoring component, configured for computing at least one priority score for at least one entity of the industrial system contained in the knowledge graph and/or at least one of the events based on the probability scores.

The following advantages and explanations are not necessarily the result of the object of the independent claims. Rather, they may be advantages and explanations that only apply to certain embodiments or variants.

In embodiments, the method and system, or at least some of their embodiments, use the probability scores to compute priority scores for some or all possible events in the industrial system as a reference to prioritize alerts coming from the security tools, which can include any simple tool for monitoring network activity, more advanced tools for detecting cybersecurity events, or any other security monitoring and detection tool.

Compared to other knowledge graph-based solutions, the method and system, or at least some of their embodiments, work in an unsupervised manner and therefore do not require known labeled anomalies or attacks to predict the maliciousness of observed events. In fact, the method and system, or at least some of their embodiments, do not directly try to infer (predict) maliciousness in entities or events on the knowledge graph (e.g., based on known examples).

Instead, priority scores can be computed for some or all possible events, and these priority scores are in turn used during operation to evaluate actual system observations and prioritize them, so that attention can be drawn to the ones most likely to be security relevant.

As a result, the method and system, or at least some of their embodiments, provide a knowledge graph-based recommendation system for automated analysis of industrial cybersecurity events.

In an embodiment of the method and system, the estimating operation and/or the computing operation implement a ranking-based metric, in particular a recommender system metric, in particular mean average precision, mean reciprocal rank, or normalized discounted cumulative gain.

In an embodiment of the method and system, the estimating operation includes
generating, by a candidate generation component, at least one candidate list for each observed triple statement, containing as candidate triples the respective observed triple statement as well as variations thereof, and
creating a ranked candidate list for each candidate list by estimating, by the link-prediction component, a probability score for each candidate triple, and
sorting the candidate triples by their probability score.
The computing operation includes
calculating, by the scoring component, a relevance score for each observed triple statement based on its position in the corresponding at least one ranked candidate list, and
aggregating, by the scoring component, several relevance scores into the at least one priority score.

This embodiment is ranking candidate triples (including those from non-malicious events) by link prediction in order to produce relevance scores for all possible system interactions. The relevance scores are more robust and better calibrated than the probability scores provided by the link-prediction model.

According to this embodiment, candidate lists are used to generate rankings as a reference to compute the priority scores, using, for example, standard ranking metrics rather than relying uniquely on the probability scores estimated by the link-prediction model, thus improving the stability and robustness of the predictions.

In an embodiment of the method and system, the at least one priority score is used for ranking and/or prioritizing output of the at least one security tool.

This embodiment provides recommendations for automated analysis of industrial cybersecurity events, by using the priority scores during operation to evaluate actual system observations and prioritize them.

In an embodiment of the method and system, the ranked and/or prioritized output of the at least one security tool is displayed on a user interface, stored in a log, and/or automatically processed in order to automatically generate an alarm or automatically shut down at least a part of the industrial system.

When displayed on a user interface, a user can decide whether the entities in the industrial system are behaving as expected or anomalies are found that deserve investigation.

In an embodiment of the method and system, the link-prediction component uses at least one link-prediction model. The embodiment of the method includes an initial step of training the at least one link-prediction model with baseline data received from the at least one security tool during a baseline period of the industrial system, wherein the training is in particular unsupervised.

In an embodiment of the method and system, the training includes
- producing, by the first mapping component, first triple statements from the baseline data,
- producing, by a second mapping component, second triple statements from second data received from at least one domain specific tool, with the second data containing knowledge about the industrial system, in particular a description of the industrial system, a production schedule, a maintenance plan, and/or a digital twin,
- producing, by a third mapping component, third triple statements from third data received from at least one additional context, with the third data containing information about cybersecurity vulnerabilities and threats,
- thereby semantically integrating, in a graph database, the first triple statements, the second triple statements, and the third triple statements into at least one knowledge graph, and
- training, by a learning component, each of the at least one link-prediction models with triple statements of one of the at least one knowledge graphs.

This embodiment provides an integration of domain-specific knowledge from industrial control and automation projects together with traditional network and host information in a common knowledge graph so that the additional context makes the system better able to distinguish normal and malicious activity.

Furthermore, this embodiment allows for an unsupervised initial training without provision of known labeled anomalies or attacks.

In an embodiment of the method and system, each observed triple statement consists of a subject, a predicate, and an object, where the subject is represented by a node of the knowledge graph representing an entity of the industrial system, the predicate is one of a finite set of possible relationship types, and the object is either a node of the knowledge graph representing an entity of the industrial system or a literal value, with nodes of the knowledge graph representing physical entities, in particular sensors, industrial controllers, robots, drives, manufactured objects, tools and/or elements of a bill of materials, and with nodes of the knowledge graph representing abstract entities, in particular attributes, configurations or skills of the physical objects, production schedules and plans, and/or sensor measurements. The first mapping component produces one or more observed triple statements for each event.

BRIEF DESCRIPTION

Some of the embodiments will be described in detail, with reference to the following figures, wherein like designations denote like members, wherein.

DETAILED DESCRIPTION

Figure 1:
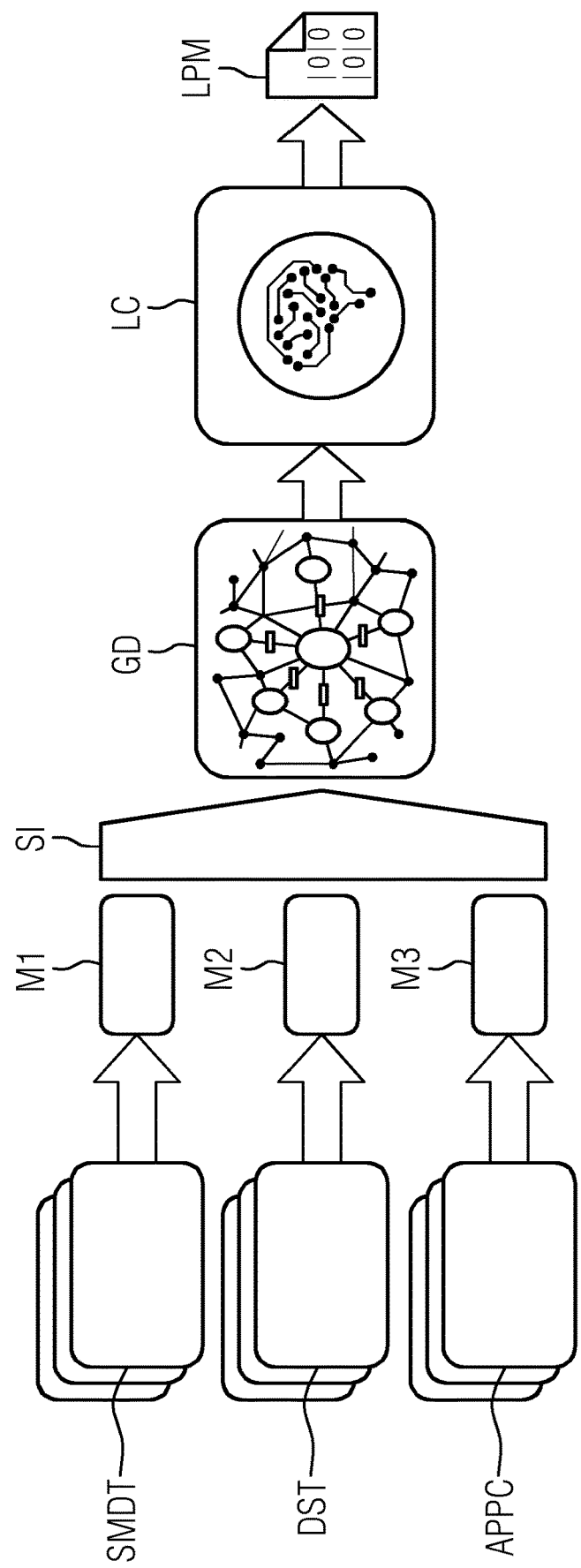
FIG. 1 shows an embodiment of a training system for training a link-prediction model LPM during a baseline period of a monitored industrial system.

In the following description, various aspects of the present invention and embodiments thereof will be described. However, it will be understood by those skilled in the conventional art that embodiments may be practiced with only some or all aspects thereof. For purposes of explanation, specific numbers and configurations are set forth in order to provide a thorough understanding. However, it will also be apparent to those skilled in the conventional art that the embodiments may be practiced without these specific details.

In the following description, the terms "mode" and "phase" are used interchangeably. If a learning component runs in a first mode, then it also runs for the duration of a first phase, and vice versa. Also, the terms "triple" and "triple statement" and "statement" will be used interchangeably.

Nickel, M., Tresp, V. & Kriegel, H.-P.: A three-way model for collective learning on multi-relational data, in Icml 11 (2011), pp. 809-816, disclose RESCAL, a widely used graph embedding algorithm. The entire contents of that document are incorporated herein by reference.

Yang, B., Yih, W.-t., He, X., Gao, J. and Deng, L.: Embedding entities and relations for learning and inference in knowledge bases, arXiv preprint arXiv:1412.6575 (2014), disclose DistMult, which is an alternative to RESCAL. The entire contents of that document are incorporated herein by reference.

Bordes, A. et al.: Translating embeddings for modeling multi-relational data, in Advances in neural information processing systems (2013), pp. 2787-2795, disclose TransE, which is a translation based embedding method. The entire contents of that document are incorporated herein by reference.

Schlichtkrull, M., Kipf, T. N., Bloem, P., van den Berg, R., Titov, I. and Welling, M.: Modeling Relational Data with Graph Convolutional Networks, arXiv preprint arXiv: 1703.06103 (2017), disclose Graph Convolutional Neural networks. The entire contents of that document are incorporated herein by reference.

Hopfield, J. J.: Neural networks and physical systems with emergent collective computational abilities, in Proceedings of the national academy of sciences 79, pp. 2554-2558 (1982), discloses energy-based models for computational neuroscience and artificial intelligence. The entire contents of that document are incorporated herein by reference.

Hinton, G. E., Sejnowski, T. J., et al.: Learning and relearning in Boltzmann machines, Parallel distributed processing: Explorations in the microstructure of cognition 1, 2 (1986), disclose Boltzmann machines, which combine sampling with energy-based models, using wake-sleep learning. The entire contents of that document are incorporated herein by reference.

Many existing IDS solutions consider only network data (e.g., observed connections between hosts) for decision making. More advanced ones may consider also events happening inside the hosts themselves by integrating host or app logs. However, in OT systems this is typically not sufficient to determine whether an event is potentially malicious or not, and this can only be determined by considering domain-specific context.

As an example, a predictive maintenance industrial application may regularly read or write variables available on a PLC controller, for instance using an industrial protocol like OPC-UA. After an update of the application (which happens regularly) it may start accessing new variables, which may trigger alerts in a conventional IDS until the baseline is updated with the updated app behavior. Frequently updating baselines after each small system change is costly as well as risky as it would consider any undetected malicious activity happening during baselining as normal behavior.

A better approach would be to avoid any new baselining and instead have an intelligent system that is able to determine whether the new variables that the application is accessing are consistent with the purpose of the application (condition monitoring) as well as the originally accessed variables during baselining. For instance, if the original variables are all related to a specific part of the industrial system (e.g., a specific set of sensors, or a drive system), and the new variables are also related to these components, then the intelligent IDS can determine that the new variable access events are probably not malicious. However, if the new variables are completely unrelated to the original ones, e.g., they control a valve or an air quality system which are not part of the subsystem being monitored by the application, the intelligent IDS may consider this as highly anomalous and a potential attack.

The previous example is a simple one. In practice, many factors and events performed by entities in the system may influence how suspicious any given observation is, and this makes it impossible in practice to define fixed rules that detect anomalies. Instead, the following embodiments use relational learning in order to automatically learn normal behavior based on a context-rich but potentially incomplete graph-based representation of legitimate interactions between entities in an industrial system.

Figure 8:
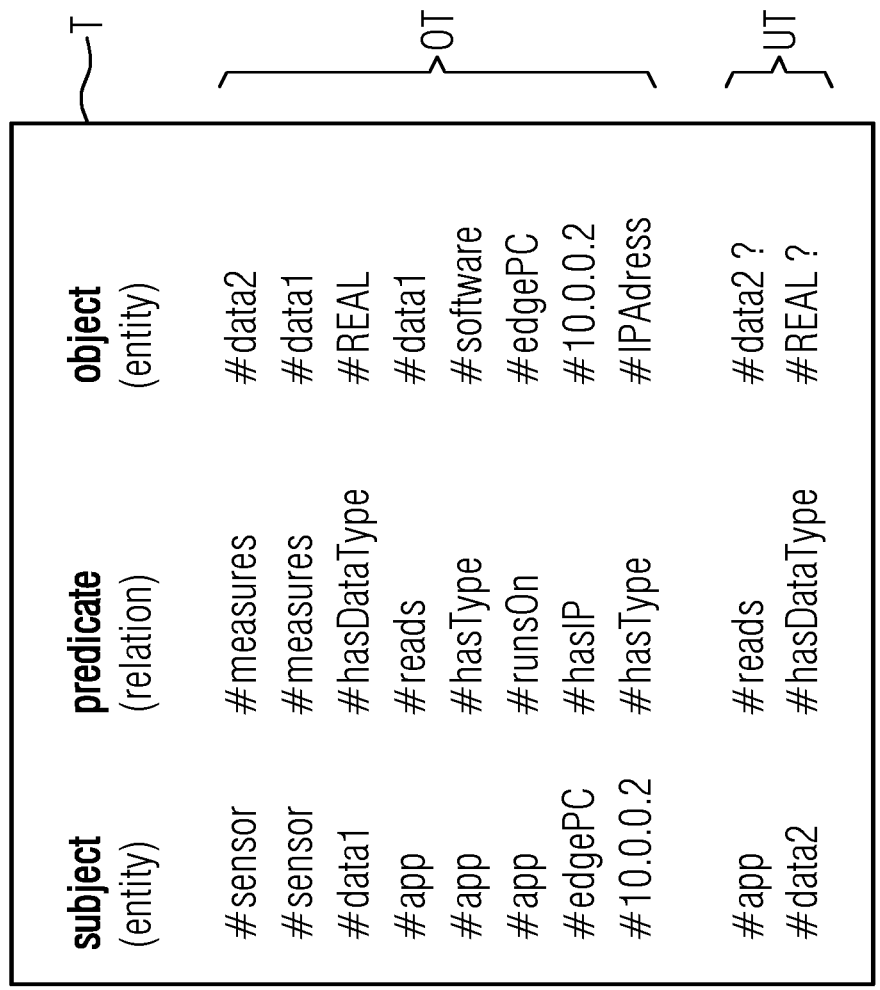
FIG. 8 shows examples of triple statements T corresponding to the industrial knowledge graph KG shown in FIG. 7.

FIG. 1 shows an embodiment of a training system for training a link-prediction model LPM during a baseline period of a monitored industrial system (baselining). The objective of the training system is to produce a link prediction model LPM based on a knowledge graph stored in a graph database GD and composed of multiple true triple statements (true meaning observed during baselining or stemming from other reliable sources). Such a graph can be represented by RDF triples, that is, statements of type subject-predicate-object where the subject is represented by a node of the graph representing an entity of the industrial system, the predicate is one of a finite set of possible relationship types, and the object is either a node of the knowledge graph representing an entity of the industrial system or a literal value. In the first case, a statement in the form 's-p-o' is a semantic triple meaning that entity s has relation p with entity o. While the nodes of the graph mainly represent entities of the industrial system, literal values can be included as auxiliary nodes in the graph. Examples for the triple statements are shown in FIG. 8.

The triple statements filling the graph database GD can be generated from multiple sources of data by mapping components M1, M2, M3 as shown in FIG. 1. The task of the mapping components M1, M2, M3 is to extract, transform and load information from multiple data sources into triple statements according to a predefined vocabulary (a set of entities and relationships). More specifically, the mapping components M1, M2, M3 map information contained in the data sources to triple statements. Different alternatives for the mapping components M1, M2, M3 exist in the literature, e.g., R2RML for mapping between relational database data and RDF. An alternative to R2RML is RML, an upcoming, more general standard that is not limited to relational databases or tabular data.

In this way, the mapping components M1, M2, M3 perform a semantic integration SI, while moving information from the data sources to the graph database GD.

The graph database GD can be implemented as a triple store, creating a dynamically changing knowledge graph. For example, the graph database GD can be implemented as a local database in a permanent storage (e.g., a hard disk).

According to the embodiment shown in FIG. 1, the mapping components M1, M2, M3 help to integrate heterogeneous information from three categories of data sources into a single knowledge graph stored in the graph database GD: security monitoring and detection tools SMDT, domain specific tools DST, and additional public and private context APPC.

The security monitoring and detection tools SMDT, for example network based or host based existing intrusion detection systems, provide events such as network/host events and alerts as first data. These are typically provided in the form of text files or logs with observations recorded in a sequential manner. According to the embodiment shown in FIG. 1, a first mapping component M1 produces one or multiple triple statements from each entry in the corresponding logs. For example, if a connection is observed between two IP addresses with a specific protocol/port, we may generate a statement such as <IP 1><Protocol_Port><IP 2>, linking two nodes (corresponding to the IP addresses) with a relationship that denotes the protocol and port used. More complex representations are possible that include multiple triples with additional entities and capture additional connection metadata observed such as durations, data volumes, connection states, domains, physical device addresses, etc. These triple statements can use well-defined standard vocabularies such as the Structured Threat Information expression (STIX) to guarantee interoperability and interpretability by security analysts. The security monitoring and detection tools SMDT or in short security tools can also include simple tools that, for example, are simply tracking network connections without further processing.

The domain specific tools DST provide domain-specific knowledge as second data that is mapped by a second mapping component M2 into the graph database GD, in other words integrated and linked with the above events (more specifically, the triple statements produced from the first data) to provide context. For example, the domain-specific knowledge can refer to industrial control and automation projects. The domain specific tools DST are, for example, engineering tools used to design industrial systems such as Siemens TIA Portal or PCS7. These tools can typically extract and export a description of an OT system/ automation project using standard languages such as the Automation Markup Language (AML), which can be parsed via the second mapping component M2 in order to generate triple statements containing a description of the physical systems and components behind the network events and alerts generated by security tools. Additional domain context can come from other domain specific tools DST such as production schedules, maintenance plans, asset and operation databases, digital twins, and similar software tools.

The additional public and private context APPC contains as third data for example information about vulnerabilities and threats from internal or public databases or threat intelligence feeds. The third data is mapped by a third mapping component M3 into the graph database GD, in other words integrated and linked with the triple statements representing the first data and second data to provide context.

According to the embodiment, the training system provides one or more interfaces for importing the data from the security monitoring and detection tools SMDT, the domain specific tools DST, and the additional public and private context APPC.

In practice, multiple different graphs can be created by integrating different sources, or the same sources but captured at different times. The different graphs can be stored in the graph database GD. This may be advantageous if substantially different behaviors are expected in different scenarios, for example between operation mode and maintenance mode, during the day or night or according to different configurations of a flexible manufacturing system.

For each resulting graph, an individual link-prediction model LPM is trained by feeding triple statements corresponding to each single graph to independent link-prediction model LPM instances. Each link-prediction model LPM is a machine learning model capable of making predictions by way of inference and can be trained in a self-supervised manner using a learning component LC implementing machine learning algorithms such as the ones described below, for example RESCAL, TransE, TransH, DistMult.

The training process produces a set of parameters and coefficients that solve a specific training objective. The training objective defines a task that the learning algorithm implemented in the learning component LC tries to solve, adjusting the model parameters in the process. It is advantageous to perform this step in an unsupervised or self-supervised manner, i.e., without necessarily providing ground truth labels (i.e., the solution to the problem). In the case of a graph algorithm, this can be accomplished for instance by using a link prediction task as the training objective. In this setting, the learning process is iteratively presented with batches containing samples from the observed triples, together with internally generated negative examples (non-observed triples), with the objective of minimizing a loss function based on the selected examples, which will assign a lower loss when positive and negative examples are assigned high and low scores respectively by the algorithm, iteratively adjusting the model parameters accordingly. Generation of negative samples can be performed in a random manner (e.g., by generating perturbations of existing triple statements) and in some embodiments, if an existing dataset of negative interactions is available (e.g., containing known anomalous or even malicious interactions), this can be used as a basis to generate more targeted negative examples.

As mentioned above, there are several options regarding relational learning algorithms that can be employed as embodiments. The selected algorithm determines the specific internal operations and parameters as well as the loss/scoring function that guides the learning process, which can be implemented in a conventional CPU or DSP processing unit, or alternatively on specialized machine learning co-processors. For example, in the case of a RESCAL implementation a graph is initially converted to its adjacency form with which the RESCAL gradient descent optimization process is performed. The mathematical foundations of this approach will be explained in more detail below. An alternative is provided by the scoring function of DistMult, which reduces the number of parameters by imposing additional constraints in the learned representations. A further alternative would be to use a translation based embedding method, such as TransE which uses the distance between object embedding and subject embedding translated by a vectorial representation of the predicate connecting them.

Figure 2:
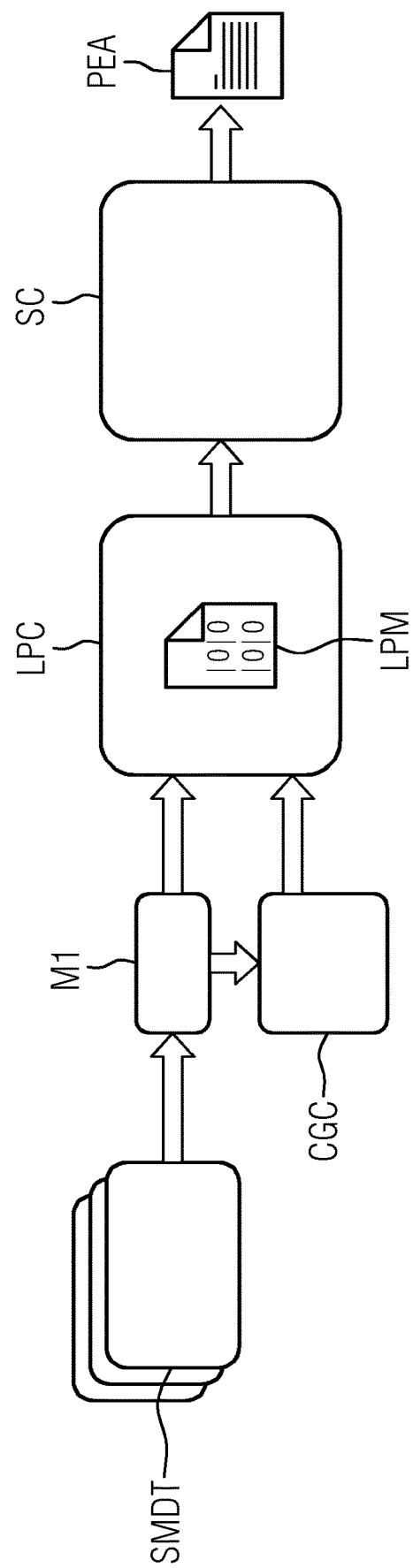
FIG. 2 shows an embodiment of a system for automated analysis of industrial cybersecurity events.

According to one of several possible implementations, it is possible for the learning component LC to turn into the link-prediction model LPM—or the link-prediction component LPC shown in FIG. 2—once trained. In that case, the learning component LC is controlled by a control component that can switch between different modes of operation of the learning component LC, either autonomously (e.g., periodically) or based on external stimuli (e.g., a specific system state, or an operator provided input). One of the selectable modes of operation of the learning component LC is a learning mode, and another an inference mode, turning the learning component LC effectively into the link-prediction model LPM or the link-prediction component LPC shown in FIG. 2.

During training, the triple statements stored in the graph database GD are provided to the learning component LC, which in response iteratively updates its internal state with learning updates according to a specific cost function as described below. In this regard, the learning component LC implements a machine learning algorithm such as the ones described below.

A further mode of operation is inference mode, where the link prediction model LPM as part of the link-prediction component LPC shown in FIG. 2, or the trained learning component LC acting as the link-prediction component LPC—makes predictions about the likelihood of unobserved triple statements.

Inference mode can either be a free-running mode, whereby random triple statements are generated by the link prediction model LPM based on the accumulated knowledge, or a targeted inference mode, where the control component specifically sets the link prediction model LPM in such a way that the likelihood of specific triple statements is evaluated.

For instance, in a link prediction setting, the inference could be a prediction of a certain triple statement, e.g., "system enters_state error", by the link prediction model LPM. The link prediction model LPM can also be used to identify specific triple statement for which the predicted likelihood (inference) is low, indicating events that are currently unexpected.

Various learning algorithms and optimization functions are described in the following, which are suitable for implementing the learning component LC, the control component and/or the link prediction model LPM.

The learning component LC (and the control component if it guides the learning process) can be implemented with any algorithm that can be trained on the basis of knowledge graphs, using either transductive algorithms, which are able to learn representations for a fixed graph, for example RESCAL, TransE, or DistMult, or inductive algorithms, which can learn filters that generalize across different graphs, for example Graph Convolutional Neural networks (Graph CNN). In the case of the former an individual link prediction model LPM is trained for each graph stored in the graph database GD (feeding triple statements corresponding to each single graph to independent link prediction model LPM instances) whereas in the case of the latter, a single link prediction model LPM is trained based on all the graphs.

In either case, we can differentiate between a learning mode, where the triple statements are presented to the learning component LC which learns a set of internal operations, parameters and coefficients required to solve a specific training objective, and an inference mode, where the link prediction model LPM evaluates the likelihood of newly observed or hypothetical triple statements on the basis of the learned parameters.

The previous examples can be considered as decoder based embedding methods. In the case of a Graph CNN based implementation, the algorithm to be trained consists of an encoder and a decoder. The encoder comprises multiple convolutional and dense filters which are applied to the observed graph provided in a tensor formulation, given by an adjacency matrix indicating existing edges between nodes, and a set of node features which typically correspond to literal values assigned to the corresponding node in the RDF representation in the graph database GD, to which a transformation can be optionally applied in advance (e.g. a clustering step if the literal is of numeric type, or a simple encoding into integer values if the literal is of categorical type). On the other hand, the decoder can be implemented by a DistMult or similar decoder network that performs link scoring from pairs of entity embeddings.

It should be noted that most of the score functions required by knowledge graph learning algorithms, in addition to tunable parameters which are optimized during learning, typically also contain a set of hyperparameters that control the learning process of the learning component LC itself, such as learning rates, batch sizes, iteration counts, aggregation schemes and other model hyperparameters present in the loss function. In the context of the present embodiment, these can be preconfigured within the control component and/or the learning component LC with known working values determined by offline experimentation. An alternative, performing a complete or partial hyperparameter search and tuning directly during training would also be possible, at the cost of potentially having to perform an increased number of learning steps, in order to evaluate the performance of the algorithms for different sets of hyperparameters on the basis of an additional set of triple statements reserved for this purpose. In other words, the learning process can be controlled with external operator input into the control component and feedback, or be autonomous as described above.

The learning component LC can be implemented as a probabilistic learning system that realizes inference and learning in the same substrate. The state of the learning component LC is described by an energy function E that ranks whether a triple statement (or several triple statements) is true or not, with true triple statements having low energy and false triple statements having high energy. Examples for the energy function E will be given below. From the energy function E, interactions between components of the learning component LC can be derived. For simplicity, we describe the probabilistic learning system of the learning component LC for the DistMult scoring function and provide a generalization to RESCAL later.

Tensor-Based Graph Embeddings

A widely used graph embedding algorithm is RESCAL. In RESCAL, a graph is represented as a tensor $X_{s,p,o}$, where entries are 1 if a triple 's-p-o' (entity s has relation p with entity o) occurs in the graph and 0 otherwise. This allows us to rephrase the goal of finding embeddings as a tensor factorization problem $$X_{s,p,o} \stackrel{!}{=} e_s^T R_p e_o, \qquad (1)$$

with each graph entity s being represented by a vector $e_s$ and each relation p by a matrix $R_p$. The problem of finding embeddings is then equivalent to minimizing the reconstruction loss $$L_{MSE} = \sum_{s,p,o} \|X_{s,p,o} - e_s^T R_p e_o\|^2 \qquad (2)$$

which can either be done using alternating least-square optimization or gradient-descent-based optimization. Usually, we are only aware of valid triples, and the validity of all other triples are unknown to us and cannot be modeled by setting the respective tensor entries to 0. However, only training on positive triples would result in trivial solutions that score all possible triples high. To avoid this, so-called 'negative samples' are generated from the training data by randomly exchanging either subject or object entity in a data triple, e.g., 's-p-o' ∈ D→'a-p-o' or 's-p-o'∈D→'s-p-b'. During training, these negative samples are then presented as invalid triples with tensor entry 0. However, negative samples are not kept but newly generated for each parameter update.

Energy-Based Tensor Factorization

We propose a probabilistic model of graph embeddings based on an energy function that takes inspiration from the RESCAL scoring function. Energy-based models have a long history in computational neuroscience and artificial intelligence, and we use this as a vehicle to explore possible dynamic systems that are capable of implementing computations on multi-relational graph data.

Energy Function for Triples

Given a tensor X that represents a graph (or subgraph), we assign it the energy $$E(X) = -\sum_{s,p,o} X_{s,p,o} \theta_{s,p,o} \qquad (3)$$

where $\theta_{s,p,o}$ is the RESCAL score function. From this, we define the probability of observing X $$p(X) = \frac{1}{Z} e^{-E(X)}, \qquad (4)$$

$$\text{with } Z = \sum_{X'} e^{-E(X')} \qquad (5)$$

where we sum over all possible graph realizations X'. Here, the $X_{s,p,o} \in [0, 1]$ are binary random variables indicating whether a triple exists, with the probability depending on the score of the triple. For instance, a triple (s, p, o) with positive score $\theta_{s,p,o}$ is assigned a negative energy and hence a higher probability that $X_{s,p,o}=1$. This elevates RESCAL to a probabilistic model by assuming that the observed graph is merely a sample from an underlying probability distribution, i.e., it is a collection of random variables. Since triples are treated independently here, the probability can be rewritten as $$p(X) = \prod_{X_{s',p',o'}=0} (1 - \sigma(\theta_{s',p',o'})) \prod_{X_{s,p,o}=1} \sigma(\theta_{s,p,o}) \qquad (6)$$

where σ(.) is the logistic function. Thus, the probability of a single triple (s, p, o) appearing is given by σ(θs,p,o).

Maximum Likelihood Learning

The model is trained using maximum likelihood learning, i.e., node and edge embeddings are adjusted such that the likelihood (or log-likelihood) of observed triples is maximized $$\Delta R_k \propto \langle \frac{\partial}{\partial R_k} \ln p(X') \rangle_{X' \in D} \quad (7)$$

$$\Delta e_k \propto \langle \frac{\partial}{\partial e_k} \ln p(X') \rangle_{X' \in D} \quad (8)$$

where D is a list of subgraphs (data graphs) available for learning. These update rules can be rewritten as $$\Delta R_p \propto \langle e_s^T e_o \rangle_{(s,p,o) \in D} - \langle e_s^T e_o \rangle_{(s,p,o) \in S} \quad (9)$$

$$\Delta e_k \propto \langle R_p e_o \rangle_{(k,p,o) \in D} + \langle e_s^T R_p \rangle_{(s,p,k) \in D} - \langle R_p e_o \rangle_{(k,p,o) \in S} - \langle e_s^T R_p \rangle_{(s,p,k) \in S} \quad (10)$$

Relations learn to match the inner product of subject and object embeddings they occur with, while node embeddings learn to match the latent representation of their counterpart, e.g., es learns to match the latent representation of the object $R_p e_o$ if the triple 's-p-o' is in the data. Both learning rules consist of two phases, a data-driven phase and a model-driven phase—similar to the wake-sleep algorithm used to train, e.g., Boltzmann machines. In contrast to the data-driven phase, during the model-driven phase, the likelihood of model-generated triples S is reduced. Thus, different from graph embedding algorithms like RESCAL, no negative samples are required to train the model.

Sampling for Triple-Generation

To generate triples from the model, we use Markov Chain Monte Carlo (MCMC) sampling—more precisely, the Metropolis-Hastings algorithm—with negative sampling as the proposal distribution. For instance, if the triple (s, p, o) is in the data set, we propose a new sample by randomly replacing either subject, predicate or object, and accepting the change with probability $$T(\{s, p, o\} \to \{s, p, q\}) = \max[1, \exp(e_s^T R_p (e_q - e_o))] \quad (11)$$

The transition probability directly depends on the distance between the embeddings, i.e., if the embeddings of nodes (or relations) are close to each other, a transition is more likely. This process can be repeated on the new sample to generate a chain of samples, exploring the neighborhood of the data triple under the model distribution. It can further be used to approximate conditional or marginal probabilities, e.g., by keeping the subject fixed and sampling over predicates and objects.

Returning to FIG. 1, the one or more link prediction models LPM are trained based on events generated from security monitoring tools during a baseline period in which it is assumed that no malicious activity takes place. Thereafter, the link prediction models LPM can be used to rank new events and alerts generated, in order to assess and prioritize events and decide whether the entities in the system are behaving as expected or anomalies are found that deserve investigation.

FIG. 2 describes components involved when using the trained system to prioritize observed events from security monitoring tools.

The process starts with the first mapping component M1 producing one or multiple observed triple statements from an event provided by the security monitoring and detection tools SMDT as was previously described with regard to FIG. 1. According to a possible embodiment, the resulting triples can be directly fed to the trained link-prediction model LPM in order to generate probability scores that are directly used for computing at least one priority score for at least one entity of the industrial system contained in the knowledge graph and/or at least one of the events. However, training the link-prediction model LPM in such a way that it consistently scores triples across multiple relation types with limited data is difficult to achieve in practice.

Therefore, a different embodiment is shown in FIG. 2, implementing a ranking-based metric to score the events and prioritize those that should be analyzed first.

In order to do this, for each observed triple statement produced by the first mapping component M1 a candidate generation component CGC creates one or multiple candidate lists, containing as candidate triples the respective observed triple statement as well as variations thereof. Candidate lists can be generated by the candidate generation component CGC, for example, by replacing the object (or subject, or predicate) from the original triple by another candidate.

A link-prediction component LPC uses the link-prediction model LPM to estimate a probability score for each candidate triple by link prediction, since the link-prediction model LPM has been trained for link prediction in a knowledge graph representing the industrial system. The candidate triples of each candidate list are sorted by their probability score, thereby creating a ranked candidate list for each candidate list by sorting all the candidate triples from highest model score to lowest model score. The ranked candidate list can, for example, be implemented as a table, with a first column identifying the candidate triple and a second column listing its probability score.

Of course, probability scores for identical triples do not have to be recomputed by the link-prediction model LPM but may be buffered in a cache. More generally, scores for some or all possible triples may be precomputed using the trained link-prediction model LPM and stored in a cache. The link-prediction component LPC uses the cached probability scores whenever available.

Figure 3:
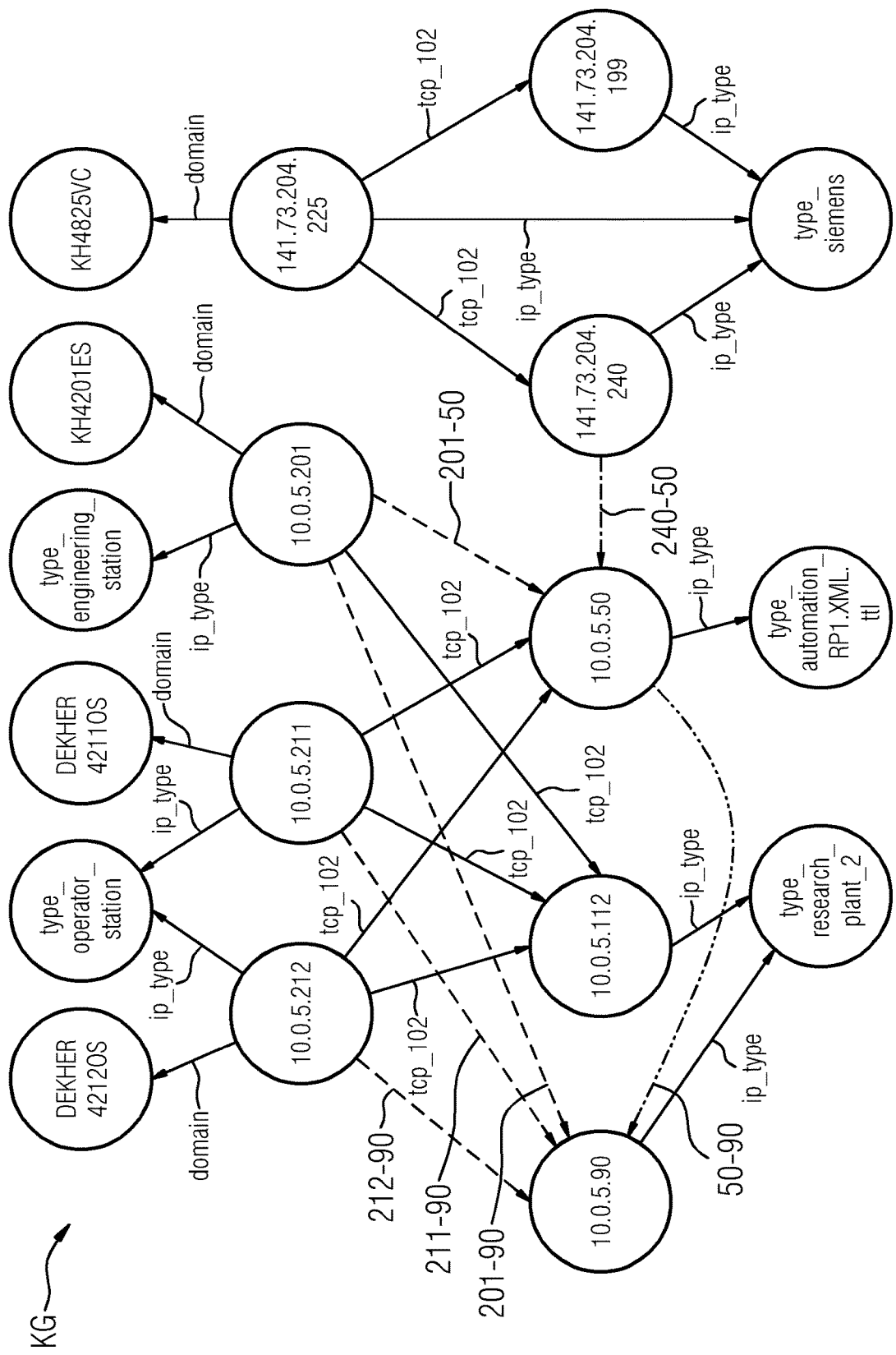
FIG. 3 shows an industrial knowledge graph KG having observed triples, overlaid with additional links expected by a link-prediction model LPM as well as additional links that are unexpected.
Figure 4:
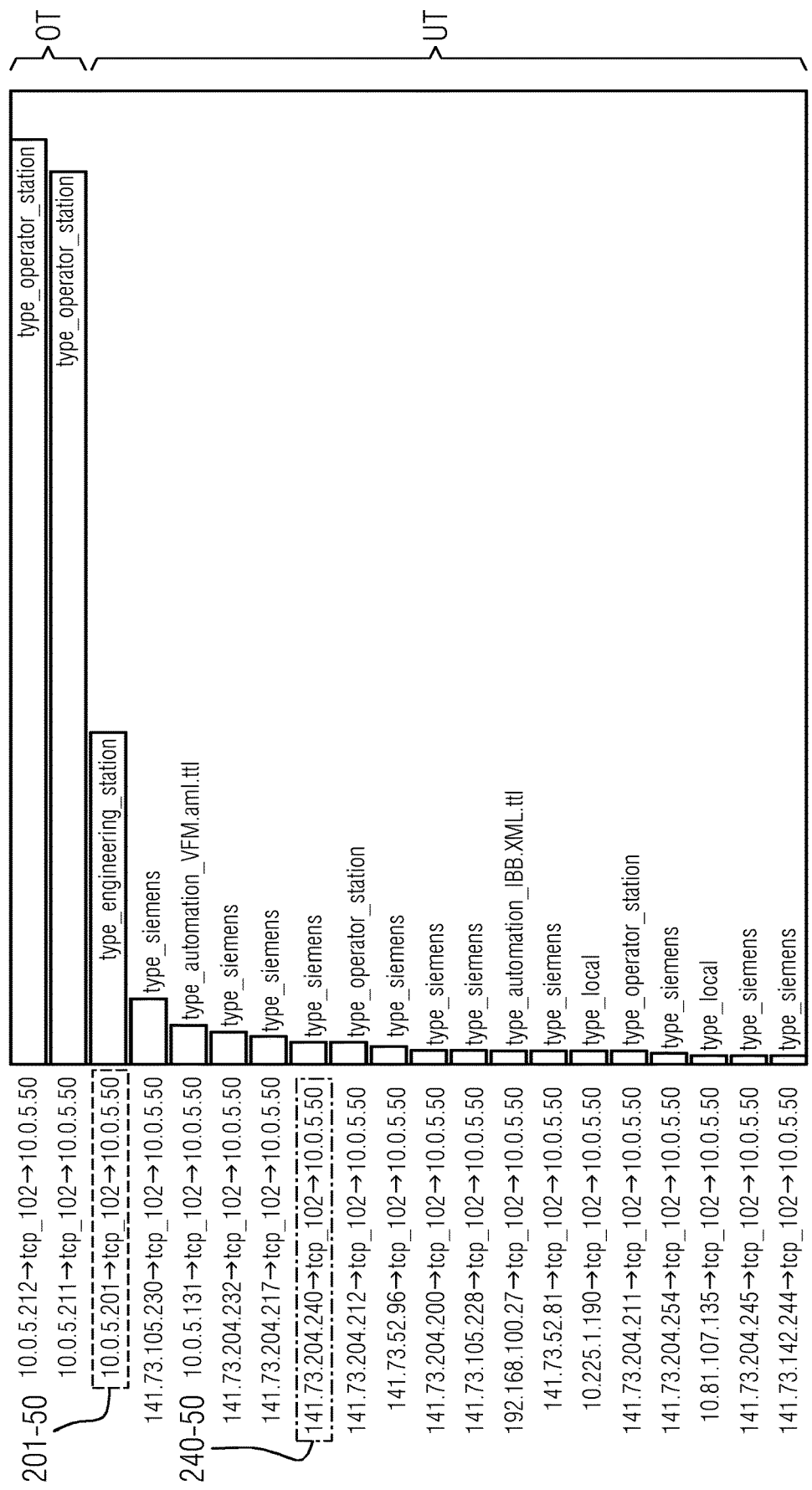
FIG. 4 shows model scores for TCP connections received by IP address 10.0.5.50, with higher scores signifying less anomalous activity.
Figure 5:
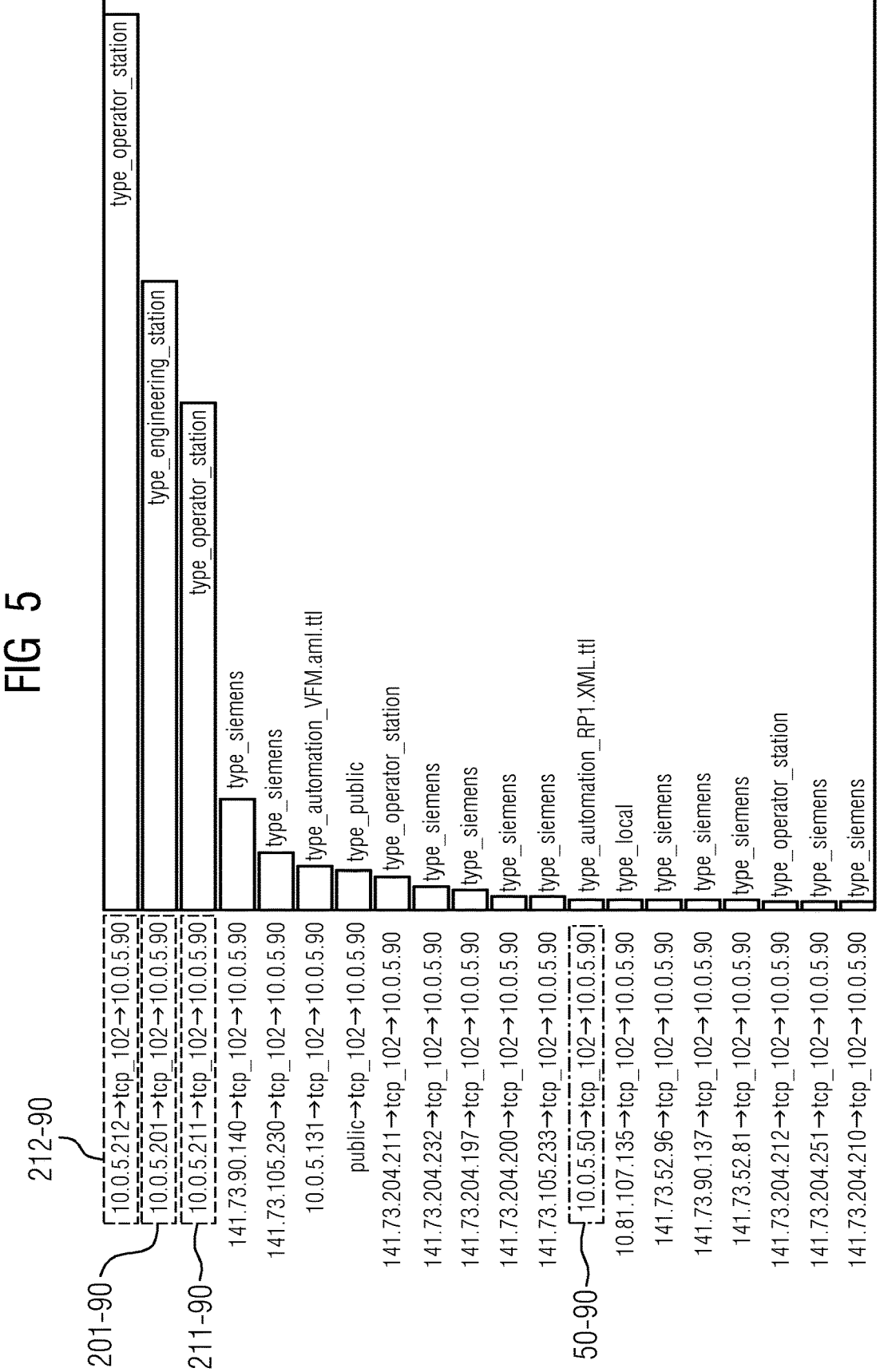
FIG. 5 shows model scores for TCP connections received by IP address 10.0.5.90, with higher scores signifying less anomalous activity.

FIGS. 3, 4, and 5 illustrate this. FIG. 3 shows an industrial knowledge graph KG containing examples of triple statements for a specific relation type (tcp_102, indicating a TCP connection on port 102). The industrial knowledge graph KG can be understood as knowledge that is implicitly encoded in the trained link-prediction model. The solid lines correspond to triples on the baseline, having been observed in the monitored industrial system during training, and are the only links actually contained in the industrial knowledge graph KG. Based on these, expected dashed links 201-50, 201-90, 211-90, 212-90, for example a first expected dashed link 201-50 are considered plausible and likely legitimate by the link-prediction model even if they were not observed during baselining, as they are consistent with the observed activity patterns, but a first unexpected dash-dotted link 240-50 and a second unexpected dash-dotted link 50-90 at the bottom of the figure should be considered anomalous by the link-prediction model as they don't follow expected patterns.

If one of these triples, <10.0.5.201><tcp_102><10.0.5.50> corresponding to the first expected dashed link 201-50 were to be observed after model training, the candidate generation component CGC shown in FIG. 2 may create a candidate list of candidate triples by replacing the source entity by any other possible entity of the same type (IP address), and the link-prediction component LPC shown in FIG. 2 would evaluate all of them, resulting in the ranking of FIG. 4. Here it is found with regard to unobserved triples UT that most of these candidates rank lower than the evaluated first expected dashed link 201-50, with the exception of observed triples OT that were part of the baseline. In fact, an unexpected triple corresponding to the first unexpected dash-dotted link 240-50 also appears on the list, in a lower position, so that if both links were to be observed, the system would recommend that the one with lower score is treated with priority by an analyst. A similar ranking is observed in FIG. 5 for links connecting to entity <10.0.5.90>, with the expected dashed links 201-90, 211-90, 212-90 ranking higher (even if unobserved during baseline) than the unexpected ones, including the second unexpected dash-dotted link 50-90.

Returning to FIG. 2, the ranked candidate lists are used by a scoring component SC to produce a relevance score for each observed triple statement, and in turn, aggregating relevance scores into priority scores for events or entities of the industrial system.

The scoring component SC works as follows. Given an event that results in one or multiple observed triple statements, each observed triple statement is individually assigned a relevance score based on its position in the generated ranking corresponding to one or multiple ranked candidate lists which are relevant for that particular observed triple statement. For instance, an observed triple statement indicating a TCP connection between two IP addresses may be ranked according to how it ranks on a ranked candidate list containing triple statements corresponding to all possible connections to the same destination, and another one containing triple statements corresponding to all possible connections from the same source, etc. Thereafter, the scoring component SC can aggregate the scores corresponding to each ranked candidate list into the relevance score for the observed triple statement. Finally, the scoring component SC can aggregate the relevance scores of all observed triple statements generated by an event into a priority score for the event, which can be understood as an overall event score.

Regarding the implementation of the scoring component SC, several options are possible both for implementing the scoring function processing the positions on the ranked candidate lists as well as the subsequent aggregation steps. In general, several known metrics from recommender systems are possible, such as mean average precision (MAP), mean reciprocal rank (MRR), normalized discounted cumulative gain (NDCG) and others. In this context, the events received from the security monitoring and detection tools can be considered as "recommendations" that have to be evaluated given the relevance scores of the corresponding observed triple statements.

The relevance scores are, as discussed, derived based on the position of the observed triple statements on the ranked candidate lists. Besides considering the absolute position on the ranked candidate list, it may be beneficial to derive the relevance scores based on the number of triples observed during baselining for each individual ranked candidate list. Intuitively, a fixed position on a ranking, for example the 10th position, would be much more anomalous on a candidate list where just one event has been observed during baselining than on a list where hundreds of events have been observed during baselining. An example of such a scoring function could be score=position/(N+1), where N is the number of triple statements on the candidate list that have been observed during the baseline period. This particular scoring function, when applied to the ranking tables of FIGS. 4 and 5, would assign higher scores to more anomalous (i.e., unexpected) triple statements.

Finally, aggregation of relevance scores into priority scores for events—or alternatively for entities if prioritizing the investigation of the behavior of entities is desired to individual events—can be carried out with several aggregation functions such as selecting the average or the maximum of the relevance scores for the corresponding observed triple statements.

The priority scores can be used for ranking and/or prioritizing output of the security monitoring and detection tools SMDT, thereby producing prioritized events and alerts PEA as shown in FIG. 2.

The prioritized events and alerts PEA can then be displayed on a user interface for further investigation, stored in a log, or automatically processed in order to automatically generate an alarm or automatically shut down at least a part of the industrial system.

Figure 6:
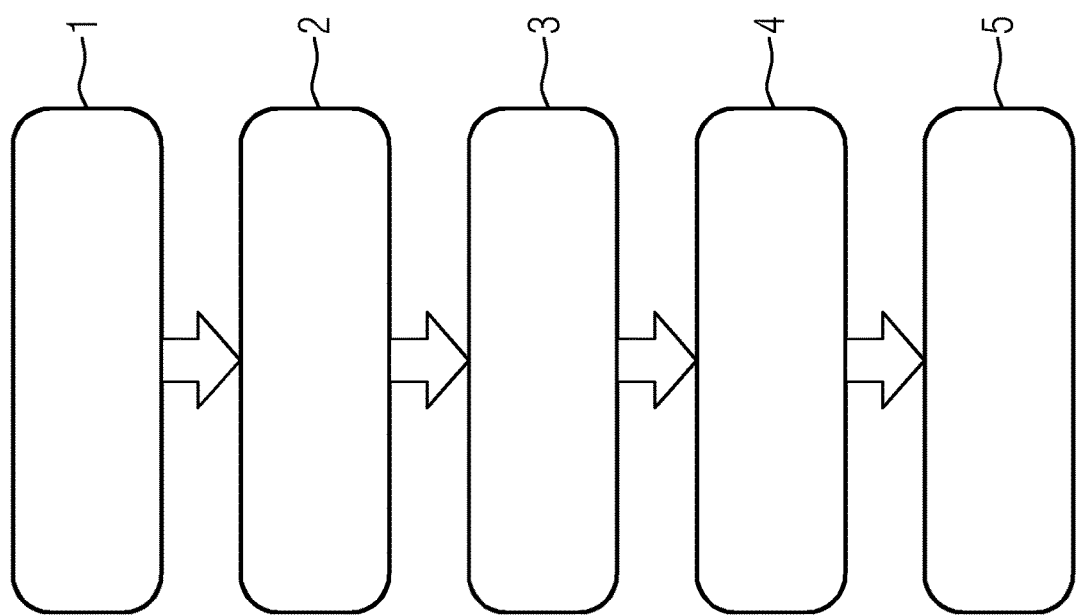
FIG. 6 shows an embodiment of a method for automated analysis of industrial cybersecurity events.
Figure 7:
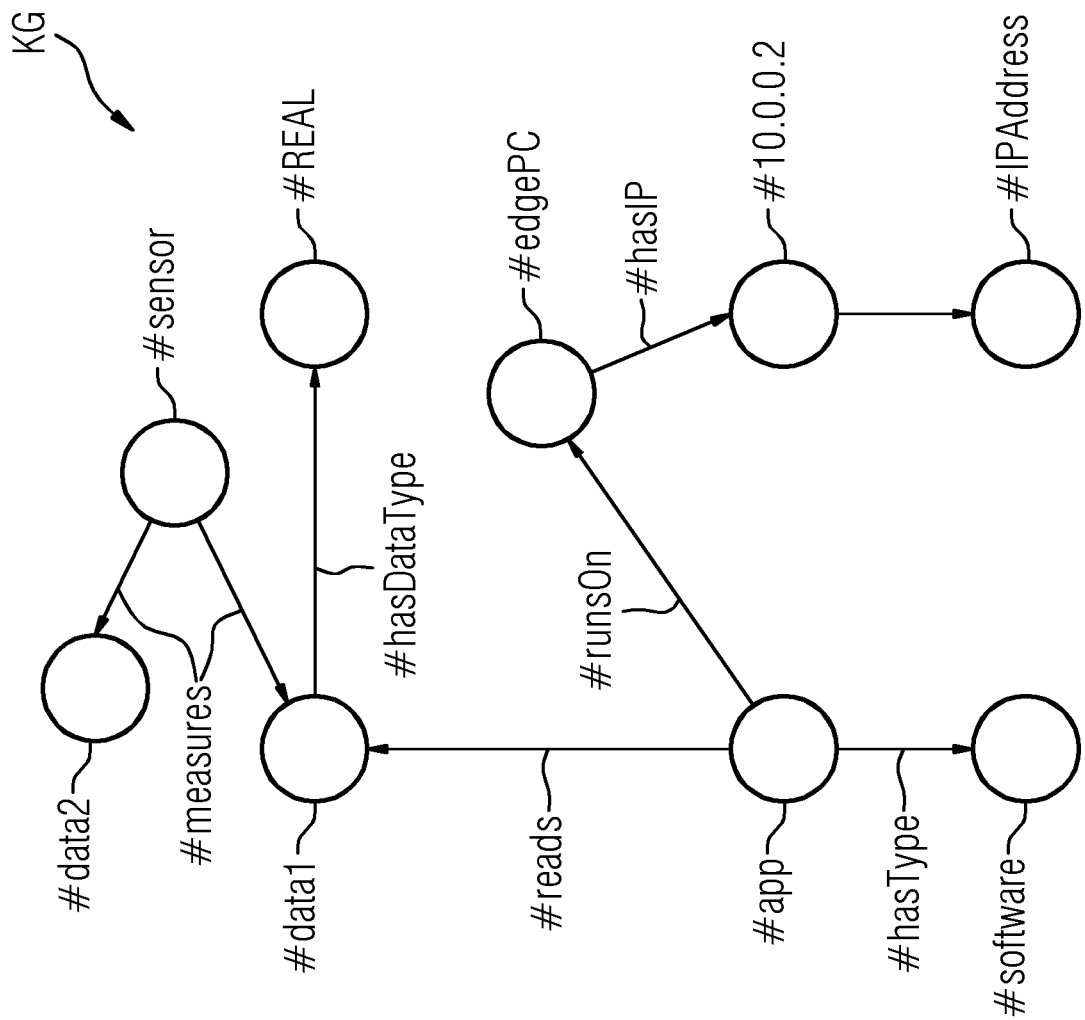
FIG. 7 shows an example of an industrial knowledge graph KG.

FIG. 6 shows an embodiment of the method as a flow chart. It should be noted that a practical implementation does not necessarily have to perform these steps in a sequential manner, as some of these steps may be precomputed (e.g., generation of candidates and the resulting ranking tables) for a more efficient implementation.

A first step 1 includes producing, by the first mapping component M1 described with regard to FIG. 1 and FIG. 2, observed triple statements from events received from at least one security monitoring and detection tool SMDT. For each event, one or more observed triple statements are produced.

A second step 2 includes generating, by the candidate generation component CGC described with regard to FIG. 2, at least one candidate list for each observed triple statement.

In an embodiment, several candidate lists are generated for each observed triple statement, for example by permutating subject, predicate, and object respectively.

A third step 3 includes creating, as described with regard to FIG. 1 and FIG. 2, a ranked candidate list for each candidate list.

A fourth step 4 includes calculating, by the scoring component SC described with regard to FIG. 2, relevance scores for each observed triple statement based on its positions in the corresponding ranked candidate lists.

A fifth step 5 includes aggregating, by the scoring component SC, relevance scores of several observed triple statements into at least one priority score for an event or an entity of the industrial system.

The described components can each be hardware components or software components. In embodiments, the method can be executed by one or more processors. Each processor can be a microcontroller or a microprocessor, an Application Specific Integrated Circuit (ASIC), a neuromorphic microchip, in particular a neuromorphic processor unit. The processor can be part of any kind of computer, including mobile computing devices such as tablet computers, smartphones or laptops, or part of a server in a control room or cloud. For example, a processor, controller, or integrated circuit of the computer system and/or another processor may be configured to implement the acts described herein.

The above-described method may be implemented via a computer program product (non-transitory computer readable storage medium having instructions, which when executed by a processor, perform actions) including one or more computer-readable storage media having stored thereon instructions executable by one or more processors of a computing system. Execution of the instructions causes the computing system to perform operations corresponding with the acts of the method described above.

The instructions for implementing processes or methods described herein may be provided on non-transitory computer-readable storage media or memories, such as a cache, buffer, RAM, FLASH, removable media, hard drive, or other computer readable storage media. Computer readable storage media include various types of volatile and non-volatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for automated analysis of industrial cybersecurity events, comprising the following operations performed by components, wherein the components are software components executed by one or more processors and/or hardware components:
   producing, by a first mapping component, observed triple statements from events received from at least one security tool monitoring an industrial system;
   estimating, by a link-prediction component, a probability score for each observed triple statement by link prediction in a knowledge graph representing the industrial system; and
   computing, by a scoring component, at least one priority score for at least one entity of the industrial system contained in the knowledge graph and/or at least one of the events based on the probability scores.

2. The method according to claim 1, wherein the estimating operation and/or the computing operation implement a ranking-based metric.

3. The method according to claim 1,
   wherein the estimating operation includes
      generating, by a candidate generation component, at least one candidate list for each observed triple statement, containing as candidate triples the respective observed triple statement as well as variations thereof; and
      creating a ranked candidate list for each candidate list by estimating, by the ink-prediction component, a probability score for each candidate triple; and sorting the candidate triples by their probability score, and
   wherein the computing operation includes calculating, by the scoring component, a relevance score for each observed triple statement based on its position in the corresponding at least one ranked candidate list, and aggregating, by the scoring component, several relevance scores into the at least one priority score.

4. The method according to claim 1, wherein the at least one priority score is used for ranking and/or prioritizing output of the at least one security tool.

5. The method according to claim 4, wherein the ranked and/or prioritized output of the at least one security tool is displayed on a user interface, stored in a log, and/or automatically processed in order to automatically generate an alarm or automatically shut down at least a part of the industrial system.

6. The method according to claim 1, wherein the link-prediction component uses at least one link-prediction model; and with an initial step of training the at least one link-prediction model with baseline data received from the at least one security tool during a baseline period of the industrial system.

7. The method according to claim 6,
   wherein the training includes
      producing, by the first mapping component, first triple statements from the baseline data;
      producing, by a second mapping component, second triple statements from second data received from at least one domain specific tool, with the second data containing knowledge about a description of the industrial system, a production schedule, a maintenance plan, and/or a digital twin;
      producing, by a third mapping component, third triple statements from third data received from at least one additional context, with the third data containing information about cybersecurity vulnerabilities and threats;
      thereby semantically integrating, in a graph database, the first triple statements, the second triple statements, and the third triple statements into at least one knowledge graph; and
      training, by a learning component, each of the at least one link-prediction models with triple statements of one of the at least one knowledge graphs.

8. The method according to claim 1,
   wherein each observed triple statement consists of a subject, a predicate, and an object, where the subject is represented by a node of the knowledge graph representing an entity of the industrial system, the predicate is one of a finite set of possible relationship types, and the object is either a node of the knowledge graph representing an entity of the industrial system or a literal value;
      with nodes of the knowledge graph representing physical entities, in particular sensors, industrial controllers, robots, drives, manufactured objects; tools and/or elements of a bill of materials; and
      with nodes of the knowledge graph representing abstract entities, in particular attributes, configurations or skills of the physical objects, production schedules and plans, and/or sensor measurements, and
   wherein the first mapping component produces one or more observed triple statements for each event.

9. A non-transitory computer-readable storage media having stored thereon: instructions executable by one or more processors of a computer system, wherein execution of the instructions causes the computer system to perform the method according to claim 1.

10. A computer program product, comprising a computer readable hardware storage device having computer readable program code stored therein, said program code executable by a processor of a computer system to implement a method, which is being executed by one or more processors of a computer system and performs the method according to claim 1.

11. The method according to claim 1, wherein the estimating operation and/or the computing operation implement a ranking-based metric that is a recommender system metric.

12. The method according to claim 1, wherein the estimating operation and/or the computing operation implement a ranking-based metric is mean average precision, mean reciprocal rank, or normalized discounted cumulative gain.

13. The method according to claim 6, wherein the training is unsupervised.

14. A system for automated analysis of industrial cybersecurity events, comprising:
- a first mapping component, configured for producing observed triple statements from events received from at least one security tool monitoring an industrial system;
- a link-prediction component, configured for estimating a probability score for each observed triple statement by link prediction in a knowledge graph representing the industrial system; and
- a scoring component, configured for computing at least one priority score for at least one entity of the industrial system contained in the knowledge graph and/or at least one of the events based on the probability scores.

15. The system according to claim 14,
wherein each observed triple statement consists of a subject, a predicate, and an object, where the subject is represented by a node of the knowledge graph representing an entity of the industrial system, the predicate is one of a finite set of possible relationship types, and the object is either a node of the knowledge graph representing an entity of the industrial system or a literal value;
- with nodes of the knowledge graph representing physical entities, in particular sensors, industrial controllers, robots, drives, manufactured objects; tools and/or elements of a bill of materials; and
- with nodes of the knowledge graph representing abstract entities, in particular attributes, configurations or skills of the physical objects, production schedules and plans, and/or sensor measurements, and wherein the first mapping component produces one or more observed triple statements for each event.

* * * * *